Figures 1, 2:
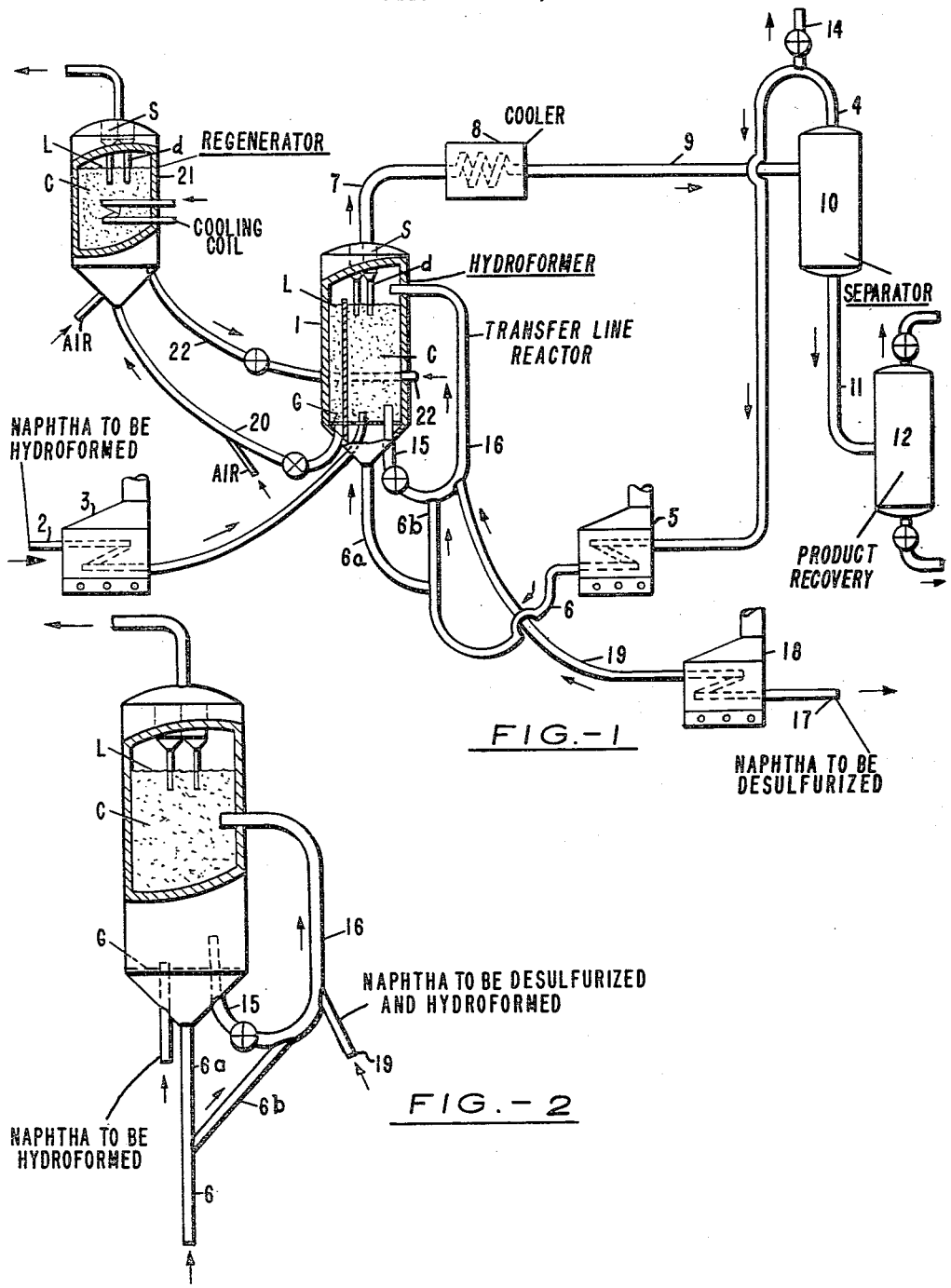

ROGER W. TATE
CHARLES E. HEMMINGER   INVENTORS

BY J. Cashman   ATTORNEY

United States Patent Office 2,773,804
Patented Dec. 11, 1956

2,773,804

HYDROFORMING AND HYDRODESULFURIZING

Roger W. Tate and Charles E. Hemminger, Westfield, N. J., assignors to Esso Research and Engineering Company, a corporation of Delaware Application December 24, 1953, Serial No. 400,233

6 Claims. (Cl. 196—28)

The present invention relates to improving naphthas with respect to octane rating and also to removal of sulfur from naphthas in a system in which the two processes are closely co-ordinated.

Hydroforming of naphthas is a matter of record and commercial practice, as is also naphtha desulfurization.

More particularly, the present invention involves hydroforming naphthas utilizing a fluidized bed of a hydroforming catalyst, and at the same time, employing the same catalyst to desulfurize, under mild conditions, a portion of the same naphtha which is hydroformed, or a different high sulfur naphtha, which latter may be blended without substantial hydroforming with other gasoline constituents to form a motor fuel, or this high sulfur naphtha may be reformed for octane improvement, as well as desulfurized.

An object of the present invention is to desulfurize naphthas utilizing means which effect important economies.

Another object of the present invention is to combine in a single system the operations of naphtha hydroforming and desulfurization, utilizing a common catalyst for both operations.

A still further object of the present invention is to supply heat to a hydroforming operation by means which effect important economies in equipment and utilities.

In the accompanying drawing there is set forth in Fig. 1 an apparatus layout in which a preferred modification of the present invention may be carried into effect; and in Fig. 2 there is set forth a fragment of the apparatus shown in Fig. 1, illustrating a modification of the apparatus depicted in Fig. 1.

Similar reference characters refer to similar parts throughout the several views.

Referring in detail to Fig. 1, 1 represents a hydroforming vessel containing a bed of fluidized catalyst C, the fluidized bed of catalyst extending from a gas distributing means G to an upper dense phase level L. A naphtha to be hydroformed is introduced into the present system through line 2, is heated in furnace 3, then passed into the bottom of vessel 1, then passed upwardly through a grid or screen G into a fluidized bed of catalyst C. Simultaneously, a recycle gas, in other words, a gas rich in hydrogen in line 4 is passed through a reheat furnace 5, withdrawn through line 6, passed into branch line 6a and then charged into the bottom of reactor 1 where it mixes with the naphtha vapors and flows therewith upwardly into the bed of catalyst C. It will be understood, of course, that the superficial velocity of the gases and vapors in the reactor are controlled within limits so as to effect the formation of a dense fluidized bed. The superficial velocity of this gasiform mixture in reactor 1 may be of the order of ½–2 feet per second where the catalyst is in the form of a powder, having a particle size of from about 0–200 microns with 55 weight percent having a particle size of from 40–80 microns. Under conditions more fully set forth hereinafter, the desired hydroforming conversion occurs and the products pass from the dense phase into a light phase disposed between L and the top of the reactor. In this light phase the major portion of the catalyst is separated from the gasiform material and returned to the dense phase. However, it is conventional practice to force these vapors about to exit from the hydroforming reactor through one or more gas-solids separators S to remove the last trace of entrained catalyst, which fines are returned to the dense phase via dip pipes d. The effluent from the reactor is taken off via line 7, and this effluent, as will be more fully pointed out subsequently, also contains desulfurized naphtha which has not passed through the bed of hydroforming catalyst C. The combined vapors in 7 are passed through a cooler 8 where they are reduced in temperature to about 100° F., whereupon the cooled material is passed via line 9 into a separator 10. From separator 10 a liquid product is withdrawn through line 11 and delivered to a product recovery system 12, where it is subjected to conventional fractional distillation and other conventional purifying means to recover the desired products. Overhead from separator 10 there is withdrawn through line 4 a recycle gas, in other words, a gas rich in hydrogen. A portion of this recycle material may be rejected from the system through vent line 14. The remainder of the material was passed through furnace 5 for preheating and recycled, as previously pointed out.

Referring again to hydroformer 1, catalyst is withdrawn from hydroformer 1 through valved line 15 and charged to a transfer line reactor 16 where it contacts naphtha vapors which contain a high percentage of sulfur. These naphtha vapors enter the present system through line 17, are heated in furnace 18, thence withdrawn and passed via line 19 into the transfer line reactor 16. There is also charged to transfer line reactor 16, a controlled amount of recycle gas via line 6b. The catalyst, naphtha vapors and recycle gas pass concurrently upwardly in transfer line 16 wherein the sulfur contained in the naphtha under conditions more fully set forth hereinafter, is removed and saturation of olefins and gum forming constituents, if present, in the feed, are accomplished. The suspension of catalyst and vapors are discharged into the hydroformer 1 at a point above the upper dense phase level L. In this space the catalyst is separated from these vapors and descends into the main body of catalyst C, while the desulfurized vapors are mixed with the hydroformed vapors from catalyst bed C, as previously indicated, and both pass from the hydroformer overhead through line 7.

Since the catalyst in hydroforming vessel 1 acquires sulfur and carbonaceous deposits, it is necessary to withdraw catalyst from reactor 1, through valved line 20 wherein it is formed into a suspension in air or air diluted with inert gas, and charged to a regeneration vessel 21 wherein it is treated with the oxygen-containing gas to remove the sulfur from the catalyst, and at the same time to burn off whatever carbon is laid down in the catalyst during the hydroforming operation. This regeneration is carried out while the catalyst is in the form of a dense fluidized bed C extending from grid or screen G to an upper dense phase level L. The regeneration of the catalyst is carried out under conventional conditions, care being taken not to heat the catalyst over about 1150° F. The hot regenerated catalyst is then returned to the reactor vessel 1 through line 22.

In Fig. 2, the operation is the same as that previously described above except that the catalyst, naphtha and recycle gas in transfer line reactor 16 are charged to the reactor vessel 1 at a point below the upper dense phase level L so that the naphtha will undergo hydroforming together with the feed naphtha introduced in line 2, thus accomplishing the result of not only desulfurizing the naphtha entering the system through line 17, but also improving its octane quality and reducing the olefin content and gum forming constituents, if present, in the feed.

It is pointed out that the foregoing showing and descriptions thereof have been simplified in the interest of clarity, and one familiar with this art will appreciate that a number of conventional accessory apparatus, such as pumps, compressors, automatic controls and the like, have not been shown in the drawings since the inclusion of these in a commercial unit would be provided for by any competent engineer.

In order more fully to explain the invention, the following example is set forth. With respect to this specific example, it is to be understood that it sets forth illustrative conditions and results, but is not to be construed as placing any limitation on the invention.

FEED STOCK INSPECTION

|  | Hydroformer | Transfer Line Desulfurizer |
|---|---|---|
| Boiling range | 250–400° F | 160–300° F. |
| Sulfur content | 0.1 wt. percent | 0.1 wt. percent. |
| Octane rating | 40 Research ON Clear. | 60 Research ON Clear. |
| Bromine No | 2 | 50. |

OPERATING CONDITIONS

|  | | |
|---|---|---|
| Catalyst composition | 10% molybdena on alumina. | 10% molybdena on alumina. |
| Pressure | 200 p. s. i. g | 200 p. s. i. g. |
| Temperature | 900° F | 700° F. |
| Feed Rate, W./Hr./W.[1] | 0.5 | 25. |
| Standard cubic feet of hydrogen per barrel of feed. | 4,000 | 500. |
| Percent hydrogen in hydrogen-containing gas. | 70 | 70. |

PRODUCT INSPECTION

|  | | |
|---|---|---|
| Yield of $C_5$+gasoline | 80% | 98%. |
| Sulfur content | .001 wt. percent. | .01 wt. percent. |
| Octane Number | 90 Research | 70 Research. |
| Bromine No | 1 | 1. |

[1] Feed rate=lbs. of oil per hour per lb. of catalyst in reactor.

In the foregoing example, the catalyst employed was 10 weight percent $MoO_3$ on alumina. It is pointed out that other known catalysts comprising an absorbent support carrying a hydrogenation-dehydrogenation component may be employed. Thus, platinum or palladium may be employed as the hydrogenation-dehydrogenation component. Also group VI metal oxides, such as $Cr_2O_3$ carried on active alumina, active carbon and the like, may be used with good results.

Also the temperatures and pressure and recycle gas rates may be varied as follows:

|  | Hydroformer | Transfer Line Desulfurizer |
|---|---|---|
| Temperature, ° F | 875–950 | 650–800 |
| Pressure, p. s. i. g | 100–400 | 100–400 |
| Feed rates (W./Hr./W.) | 0.3–0.6 | 10–30 |
| Standard cubic feet of hydrogen per barrel of oil | 2,500–8,000 | 400–600 |
| Percent hydrogen in hydrogen containing gas | 55–75 | 55–75 |

Many modifications of the present invention may be made by those who are familiar with this art without departing from the spirit thereof.

What is claimed is:

1. The method of hydroforming naphthas and at the same time desulfurizing a sulfur-containing naphtha, the last named naphtha also having a high degree of unasaturation, which comprises subjecting a naphtha to hydroforming conditions in the presence of a dense, fluidized bed having an upper dense phase level of a hydroforming catalyst and added hydrogen, in a hydroforming zone, under hydroforming conditions of temperature, pressure and contact time, withdrawing a portion of the hydroforming catalyst from said hydroforming zone and conducting it to a transfer line in communication with a lower point of said bed to receive catalyst therefrom and the upper end of said transfer line being in communication with an upper point in said hydroforming zone which line comprises a hydrodesulfurization zone, charging a naphtha having a high degree of unsaturation and also containing sulfur to the said hydrodesulfurization zone, contacting the last named naphtha with the catalyst and added hydrogen while in the form of a rapidly moving stream of the last-named naphtha and catalyst flowing concurrently upward formed by charging the last-named naphtha in vapor form to the said hydroforming zone at a lower point thereof, at a feed rate of from 10–30 pounds of naphtha per hour per pound of said withdrawn catalyst, maintaining hydrodesulfurization conditions in said line, withdrawing product from said line, charging it to the hydroforming zone and recovering from said hydroforming zone a combined product stream of improved quality.

2. The method set forth in claim 1 in which the catalyst is an VIII group metal oxide carried on an active form of alumina.

3. The method set forth in claim 1 in which the catalyst is molybdenum oxide carried on an active form of alumina.

4. The method set forth in claim 1 in which the naphtha which is desulfurized in said hydrodesulfurization zone is contacted with the hydroforming catalyst in said hydroforming zone under hydroforming conditions whereby the said naphtha is further desulfurized and improved as to octane rating.

5. The method set forth in claim 1 in which the catalyst comprises a platinum group metal as the hydrogenation-dehydrogenation component.

6. The method set forth in claim 1 in which catalyst fouled in both zones during the reactions occurring in said zones is withdrawn from the hydroforming zone, transferred to a common regeneration zone, therein treated with a regeneration gas under regeneration conditions and thereafter returned to said hydroforming zone.

References Cited in the file of this patent

UNITED STATES PATENTS

| 2,406,200 | Cole | Aug. 20, 1946 |
| 2,414,951 | Jasaitis et al. | Jan. 28, 1947 |
| 2,642,381 | Dickinson | June 16, 1953 |